United States Patent [19]

Koch

[11] Patent Number: 4,590,682
[45] Date of Patent: May 27, 1986

[54] COMPACT LEVEL

[76] Inventor: Robert E. Koch, 2150 Monterey Rd. #126, San Jose, Calif. 95112

[21] Appl. No.: 714,549

[22] Filed: Mar. 21, 1985

[51] Int. Cl.⁴ .............................................. G01C 9/28
[52] U.S. Cl. ........................................ 33/383; 33/388
[58] Field of Search ................ 33/381, 382, 383, 384, 33/388

[56] References Cited

U.S. PATENT DOCUMENTS

| | | | |
|---|---|---|---|
| 1,012,668 | 12/1911 | Lofberg | 33/383 |
| 2,541,880 | 2/1951 | McMillan et al. | 33/388 |
| 2,805,489 | 9/1957 | Kroll | 33/381 |
| 4,073,062 | 2/1978 | Wright | 33/388 |
| 4,109,392 | 8/1978 | Streeter | 33/381 |
| 4,419,833 | 12/1983 | Wright | 33/381 |

*Primary Examiner*—Richard R. Stearns

[57] ABSTRACT

A level containing horizontal, vertical and rotatable bubble capsules is constructed using only two different housing parts. The main housing is comprised of two identical halves secured back to back. A cylindrical chamber which houses the rotatable bubble is also comprised of two identical halves secured back to back. The structure is simple and economical to produce.

3 Claims, 6 Drawing Figures

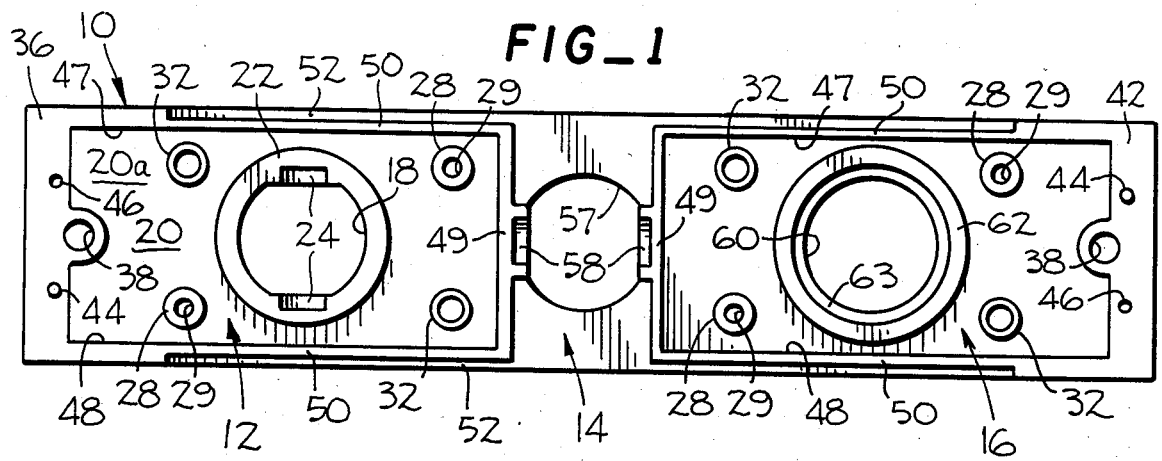
FIG_1
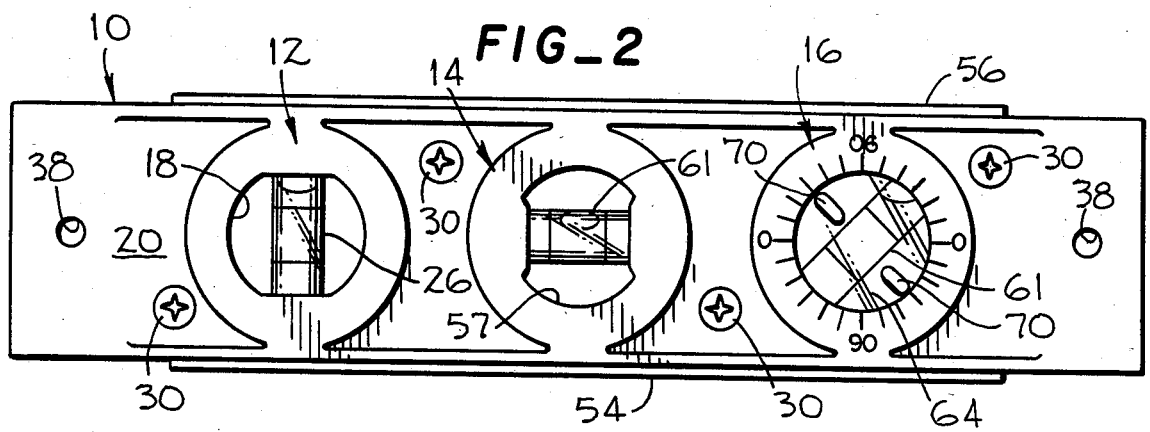
FIG_2
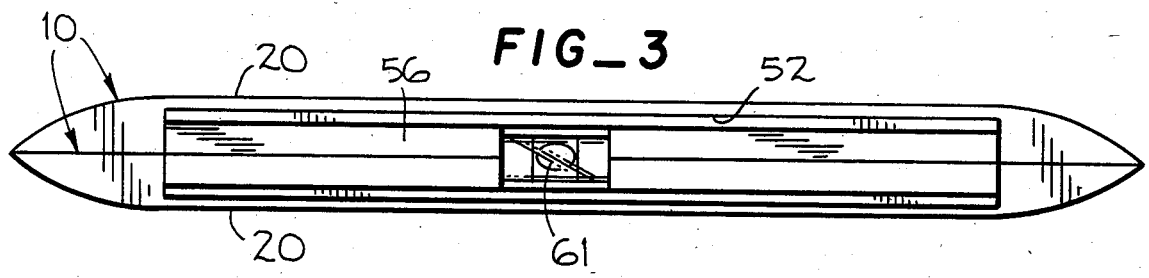
FIG_3
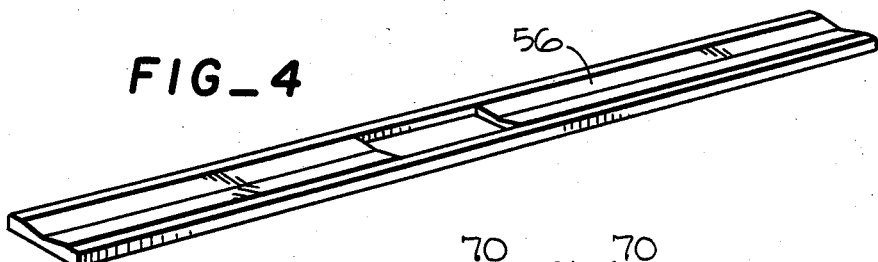
FIG_4
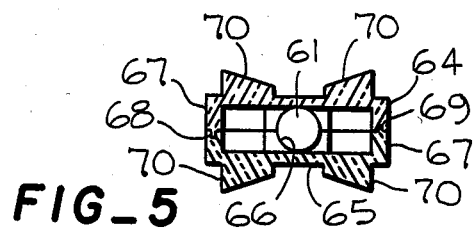
FIG_5
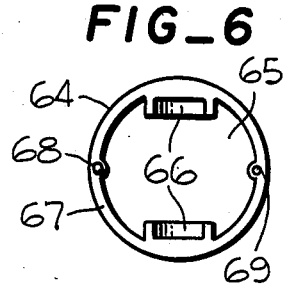
FIG_6

COMPACT LEVEL

SUMMARY OF THE INVENTION

The present invention provides an economical structure for a three way level. Preferably the size of the level is small enough to be carried in a pocket or hooked onto a work belt.

When the horizontal bubble capsule is centered it indicates that the level is resting on a horizontal surface.

When the vertical bubble capsule is centered it indicates that the level is resting against a vertical surface.

The rotatable bubble capsule can be rotated to any angle form 0° to 90°. When the rotatable bubble is centered it indicates that the level is resting on a surface inclined at the angled dialed.

One important object of the present invention is to provide a compact three way level which can easily be carried about when frequent level measurements are required. For example, electricians frequently require level measurements to aid in bending electrical conduit.

Another important objective of the present invention is to provide a level with a minimum of parts in order to hold production cost down.

These and other objects and advantages of the present invention will no doubt become apparent after reading the following detailed description of the preferred embodiment which is illustrated in figures of the drawing.

IN THE DRAWING

FIG. 1 is a side elevation view showing the structure of the inside of half of the main housing of the present invention.

FIG. 2 is a side elevation view showing the outside of the main housing.

FIG. 3 is a top view of the main housing which shows an optional V-groove part secured to the main housing top.

FIG. 4 shows a perspective view of the optional V-groove part.

FIG. 5 is a plan view showing the structure of the inside of half of the cylindrical housing which houses the rotatable bubble capsule.

FIG. 6 is a side elevational crossection view of the rotatable bubble capsule housing.

DETAILED DESCRIPTION OF THE PREFERRED EMBODIMENT

In the present invention, two identical main housing halves 10 (FIG. 1) are joined together back to back to comprise the main housing. A main housing half is a single integral piece preferably made of a high impact plastic.

The main housing 10 has three sections, the vertical bubble capsule housing section 12, the horizontal bubble capsule housing section 14 and the rotatable bubble capsule housing section 16.

Housing section 12 has a vertical bubble capsule viewing opening 18 extending through main housing side wall 20. Surrounding opening 18 is a ring shaped boss 22 that extends out from side wall 20. In opposite walls of ring boss 18 are half round nitches 24 in which the vertical bubble capsule 26 is inserted.

Four small cylindrical bosses extend from the side wall 20 of housing section 12; two screw receiver bosses 28 have blind holes 29 at their centers for receiving self-tapping screws 30 (FIG. 2); two screw guide bosses 32 have center holes 34 for guiding self-tapping screws into screw receiver bosses 28. Receiver bosses 28 are arranged relative to guide bosses 32 such that when two units of housing 10 are placed back to back, screw guide holes 34 are in alignment with screw receiver holes 29. This same construction of guide and receiver bosses is repeated in housing section 16.

The sidewall 20 of housing section 12 curves upward at one end 20a where it meets end wall 36. End wall 36 has a hole 38 through it. This hole is used for hanging the level on a wall hook, work belt or elsewhere. The construction of end wall 36 of section 12 at one end of main housing 10 is the same as the end wall 42 of section 16 at the opposite end of main housing 10.

On top of end wall 36 are an alignment nipple 44 and an alignment blind hole 46. This structure is repeated on opposite end wall 42 except position of alignment nipple and hole are reversed so that when two units of housing 10 are placed back to back nipples fit into blind holes aligning the two housing halves.

It is noted that side wall 20 extends out beyond the thin protions of top and bottom walls 47 and 48 forming ridges 50. When two units of housing 10 are assembled back to back ridges 50 become sides of shallow elongated recesses 52 in the top and bottom sides of main housing 10. Optionally into one recess is fitted an elongated magnetic bar 54 and into the other recess is fitted elongated V-groove part 56 illustrated in FIG. 4. V-groove part 56 has a rectangular hole in its center so that the horizontal bubble capsule can be viewed from the top as well as from the side of the level structure. The rubberized magnetic bar enables the level to cling to ferrous metal surfaces leaving hands free. The V-groove part enables a user of the level to easily align the level parallel to the centerline of conduit or cylindrical surfaces.

In the center section 14 of housing 10 is an opening 57 in side wall 20 for viewing the horizontal bubble capsule. Half round nitches 58 in divider walls 49 are provided for holding ends of the horizontal bubble capsule 61.

In side wall 20 of section 16 is an opening 60 for viewing the rotatable bubble capsule 61. Surrounding opening 60 is a ring shaped boss 62 whose inside diameter is greater than hole 60 thereby forming a circular ridge 63 inside the ring boss 62. Ring boss 62 and ridge 63 form a recess into which cylindrical housing 64 rotatably fits.

Cylinder housing half 64 is a short cylinder with a closed end 65. When two cylindrical housing halves are assembled back to back, they form a closed end cylinder which houses rotatable bubble capsule 61. As shown in FIGS. 5 and 6, cylindrical walls of housing 64 have half round nitches 66 which hold the rotatable bubble capsule. On top of cylinder housing walls 67 are alignment nipple 68 and blind hole 69. When two cylindrical housing halves are assembled back to back, nipples 68 fit in blind holes 69 to insure proper alignment of halves.

Protruding from the outside of the closed cylinder end 65 are levers 70 that are used to rotate the cylindrical housing with thumb and forefinger. Levers 70 and closed end cylinder are elements of a single integral piece of translucent plastic. FIG. 2 is a side elevation view showing the outside of the present level structure. Areas around capsule viewing openings are raised. Self tapping screws 30 fit in counter sunk holes and hold opposite halves of main housing 10 securely together.

As can be appreciated from the above specification and figures of the drawing, the present design enables the level to be constructed using very few parts.

It is believed apparent that the structure of the present invention is not necessarily confined to the specific structure illustrated and described above, it being considered that the structure comprehends any variations covered by the basic principles disclosed.

What is claimed is:

1. A level housing structure containing three bubble capsules, said structure comprised of two identical main housing halves and two identical cylindrical housing halves that rotatably fit in the main housing halves wherein;

a single piece main housing half is comprised of a side wall element, top and bottom wall elements, two end wall elements and two divider wall elements which divide the main housing half into three sections wherein;

within a section at one end of the main housing half is an opening in the side wall element with a ring shaped boss surrounding it, said ring boss having nitches in its wall element for holding a vertical bubble capsule;

within the midsection of the main housing half is an opening in the side wall element with nitches in the divider wall element for holding a horizontal bubble capsule;

within the section at the other end of the main housing half is an opening in the side wall element with a ring shaped boss around it, said boss having a larger inside diameter than the diameter of said opening whereby a circular ring shaped ridge is formed around said opening for retaining a rotatable cylindrical housing; and within said end sections are a plurality of pairs of self tapping screw guide and receiving bosses which are arranged in positions to align with each other when two main housing halves are placed back to back; and wherein a single piece cylindrical housing half rotatably fits in the main housing half, said cylindrical housing half comprised of: a short cylinder with a closed end from which lever elements extend and which has nitches in its cylindrical walls for holding a bubble capsule.

2. The apparatus of claim 1 wherein housing halves have pairs of nipple and blind hole elements for aligning housing halves when assembled.

3. The housing structure of claim 1 with the addition of recesses in top and bottom wall elements of the main housing half for holding a bar magnet and V-groove member.

* * * * *